Patented Dec. 26, 1933

1,941,312

UNITED STATES PATENT OFFICE 1,941,312

N-SUBSTITUTED DERIVATIVES OF THE PYRIDONE SERIES

Karl Miescher and Ernest Urech, Basel, Switzerland, assignors to the firm Society of Chemical Industry in Basle, Basel, Switzerland No Drawing. Application July 28, 1930, Serial No. 471,416, and in Switzerland August 10, 1929

5 Claims. (Cl. 260—42)

The present invention relates to new N-substituted derivatives of the pyridone series useful in therapeutics. The new products are formed by converting compounds containing the pyridone nucleus, the nuclear nitrogen of which is linked with hydrogen, or compounds containing a 2- or 4-hydroxy-pyridine nucleus, or substitution products of either of these, into derivatives which are aminoalkylated at the nucleal nitrogen.

The operation may consist in causing a reactive ester of an amino-alcohol or a derivative thereof to act upon a compound containing the pyridone or hydroxypyridine nucleus, preferably in the presence of an agent that binds acid. Alternatively the compound to be aminoalkylated may first be converted into a derivative which is halogenalkylated at the nitrogen; for instance by direct action of an alkylene polyhalide or an alkylenehalogenhydrin or an alkylene monohalide, such as an allylhalide, whereby in the two latter cases halogen is introduced in known manner by substitution or addition into the alkyl. By the action of ammonia or an amine, N-substituted halogen-alkylpyridone is converted into aminoalkylpyridone.

The new derivatives may also be obtained by converting the compounds containing the 2- or 4-hydroxypyridine nucleus into their basic ethers or their derivatives and isomerizing the ethers by simple warming.

A further form of the process consists in causing the compounds containing the pyridine nucleus having a free 2- or 4-position, or substitution products thereof, to react with an ester of an amino-alcohol and oxidizing the product of this reaction. A chemical or electrolytic process of oxidation may be used.

Another process of making the new compounds consists in causing derivatives containing the pyrone nucleus or substitution products of such derivatives to react with an alkylene-polyamine having at least one primary amino-group.

As parent materials for the invention both mono- and poly-cyclic pyridines or pyridones or pyrones may serve. The parent materials may also belong, for example, to the quinoline, acridine or isoquinoline series.

As reactive esters of aminoalcohols may be used, for example, aminoalkyl esters of hydrohalogenic or of aromatic sulfo acids.

The new compounds are useful as such, or as intermediate products, for therapeutical purposes.

The following examples illustrate the invention, the parts being by weight:—

Example 1

46.4 parts of sodium 2-pyridone are heated in a toluene solution together with 70 parts of chlorethyldiethylamine until the reaction is at an end. The solvent is expelled and the N-diethylaminoethyl-2-pyridone of the formula

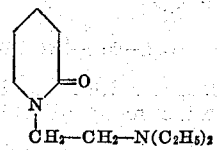

is separated by fractionation from 2-diethylaminoethoxypyridine which has been formed at the same time.

The N-diethylaminoethyl-2-pyridone is a colorless oil of boiling point 127° C. at 1 mm. pressure. Its colorless mono-hydrochloride crystallizes with one molecular proportion of water and melts at 74° C. and at 148° C. when anhydrous.

The base and its salts are freely soluble in water.

Example 2

Equivalent quantities of pyridine and chlorethyldiethylamino-hydrochloride are heated together for some time at about 125° C. 50.2 parts of the product of the reaction are dissolved in water and after addition of 32 parts of sodium hydroxide the solution is mixed gradually in the cold with an aqueous solution of 130 parts of potassium ferricyanide. When oxidation has occurred the diethylaminoethyl-2-pyridone is extracted by means of benzene and this solvent is then expelled. By distillation the base is obtained in pure form. It is identical with the base obtained in accordance with Example 1.

The oxidation may be carried out in another manner, for example, electrolytically.

The N-diethylaminoethyl-2-pyridone may further be obtained by heating 2-diethylaminoethoxy-pyridine to 220–270° C., or by causing N-β-bromo-ethyl-2-pyridone to react with diethylamine. For the production of the β-bromoethyl-2-pyridone the additive compound of ethylene-chloro-hydrine to pyridine is oxidized to form β-hydroxy-ethyl-2-pyridone of melting point 94° C. on which latter hydrobromic acid is caused to react.

Example 3

2-diethylaminoethoxy-3-pyridine-carboxylic acid-anilide is heated to 220–270° C. whereby isomerization is produced. The new base, namely N-diethylaminoethyl-2-pyridone-3-carboxylic acid-anilide of the formula

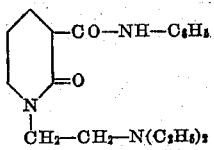

distills at 205° C. under 0.3 mm. pressure. It is soluble in organic solvents and also in acids. Its monohydrochloride melts at 195° C. and is freely soluble in water.

Example 4

2-diethylaminoethoxy-lepidine is heated at 220–300° C. After isomerization has occurred, the viscid base is distilled. It boils at 183° C. under 2 mm. pressure, and gradually becomes solid on standing. The N-diethylaminoethyl-lepidone thus produced of the formula

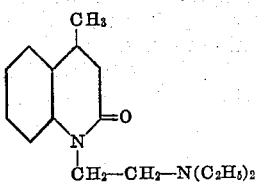

is soluble in organic solvents and in acids. Its mono-hydrochloride melts at 115° C. and dissolves freely in water.

Example 5

To a solution of 4.6 parts of sodium in 200 parts of alcohol are added 53 parts of 2-hydroxy-4-quinoline-carboxylic acid-anilide. The whole is heated to boiling while there are added, drop by drop, 35 parts of chlorethyldiethylamine. The mass is filtered from separated sodium chloride and the alcohol is distilled.

The N-diethylaminoethyl-2-quinolone-4-carboxylic acid-anilide thus produced of the formula

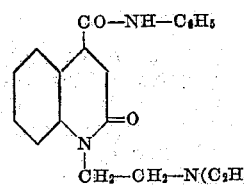

forms colorless crystals which melt at 154° C. Its monohydrochloride is freely soluble in water and melts at 258° C.

Example 6

2-diethylaminoethoxy-3-phenyl-4-quinoline-carboxylic acid-diethylamide is heated to 250–300° C. When isomerization has occurred, the N-diethylaminoethyl-2-quinolone-3-phenyl-4-carboxylic acid-diethylamide thus produced of the formula

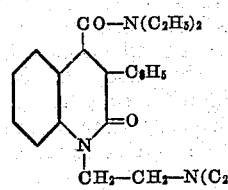

is distilled. It boils at 220° C. at 0.05 mm. pressure. From petroleum ether or ethyl acetate it crystallizes in colorless crystals which melt at 118° C. The base is soluble in benzene, in ether, in alcohol and in acids. Its colorless monohydrochloride melts at 148° C. with decomposition. The 2-diethylaminoethoxy-3-phenyl-4-quinoline-carboxylic acid-diethylamide (which is a yellow oil yielding a hydrochloride which melts at 154° C.) may be made by reaction of 2-chloro-3-phenyl-4-quinoline-carboxylic acid-diethylamide with sodium diethylaminoethanol.

Example 7

80 parts of 4-pyrone are dissolved in 100 parts of water and the solution is mixed with one of 100 parts of unsymmetrical diethyl-ethylenediamine in 100 parts of water. The mass becomes hot and yellow brown. After it has been boiled in a reflux apparatus for 2 hours it is allowed to cool and the new compound is salted out by means of potassium carbonate. It is dissolved in ethyl acetate, the solution is dried with potassium carbonate and, after evaporation of the ethyl acetate, the residue is distilled in a high vacuum. The N-diethylamino-ethyl-4-pyridone thus obtained according to the following equation:

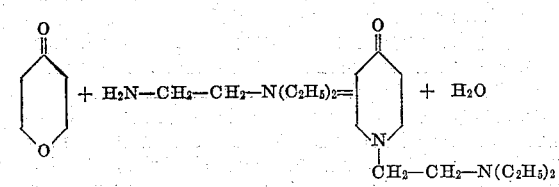

boils at 175° C. at 0.03 mm. pressure. It is a yellow, thick oil which is freely soluble in water to an alkaline solution.

Example 8

An aqueous solution of 111 parts of β-phthalimido-ethyl-pyridinium-bromide of the formula

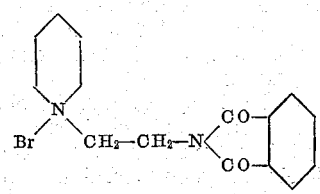

after addition of 55 parts of sodium hydroxide, is gradually mixed with an aqueous solution of 220 parts of potassium ferricyanide. After the oxidation is complete, the formed 2-pyridone-N-ethyl-phthalamic acid is separated by acidification of the solution. When crystallized from alcohol it melts at 135–137° C. When heated to a higher temperature it loses water and changes into the 2-pyridone-N-ethyl-phthalimide of melting point 205° C.

14.5 parts of the 2-pyridone-N-ethyl-phthalamic acid are saponified by boiling with concentrated hydrobromic acid. The separated phthalic acid is filtered off and the filtrate evaporated. By crystallization of the residue from alcohol the hydro-bromide of N-aminoethyl-2-pyridone of the formula

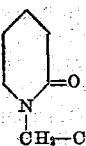

is obtained in colorless crystals of melting point

203° C. The hydrochloride melts at 183° C. Both salts are very easily soluble in water.

Example 9

An aqueous solution of 111 parts of γ-phthalimido-propyl-pyridinium-chloride of the formula,

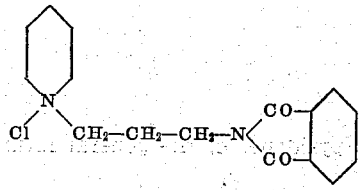

after addition of 55 parts of sodium hydroxide, is gradually mixed with a solution of 220 parts of potassium ferricyanide. After the oxidation is complete, the reaction liquid is acidified and evaporated to dryness in a vacuum. The formed 2-pyridone-N-propyl-phthalamic acid is extracted with alcohol. By dehydration it may be converted into the 2-pyridone-N-propyl-phthalimide of melting point 225° C.

30 parts of the 2-pyridone-N-propyl-phthalamic acid are saponified by boiling with hydrochloric acid of 17 per cent. strength. The separated phthalic acid is filtered off and the filtrate evaporated. By crystallization of the residue from alcohol, the N-aminopropyl-2-pyridone-hydrochloride of the formula

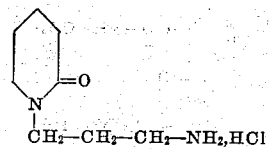

is obtained in colorless crystals of melting point 181–182° C. It is very easily soluble in water.

Example 10

Equivalent quantities of iso-quinoline and chloroethyldiethylamine-hydrochloride are heated on an oil-bath until complete solubility in water is attained.

30 parts of the hydrochloride of diethylaminoethyl-iso-quinolinium-chloride thus obtained, after addition of 30 parts of caustic potash and 100 parts of water, are oxidized with a solution of 66 parts of potassium ferricyanide. After the reaction is complete, the potassium ferrocyanide is filtered off and the N-diethylaminoethyl-iso-quinolone which has formed of the formula

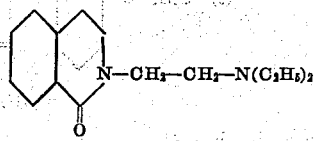

is completely separated in an oily form by addition of alkali. It distils at 175–178° C. at 1.5 mm. pressure as a light yellow oil. It is soluble in most organic solvents. With acids it forms neutral salts which are soluble in water.

In like manner there can be obtained, for example, the following derivatives:—

1. N-dimethylaminoethyl-2-pyridone-3-carboxylic acid-anilide. Mono-hydrochloride: colorless crystals of melting point 218° C.
2. N-dibutylaminoethyl-2-pyridone-3-carboxylic acid-anilide. Mono-hydrochloride: colorless crystals of melting point 181° C.
3. N-piperidinoethyl-2-pyridone-3-carboxylic acid-anilide. Mono-hydrochloride: colorless crystals of melting point 215° C.
4. N-diethylaminoethyl-2-pyridone-3-carboxylic acid-phenetidide. Mono-hydrochloride: colorless crystals of melting point 221° C.
5. N-diethylaminoethyl-2-pyridone-3-carboxylic acid-N-ethyl-anilide. Mono-hydrochloride: colorless crystals of melting point 102° C.
6. N-diethylaminoethyl-2-pyridone-3-carboxylic acid-diethyl-ethylenediamide. Di-hydrochloride: colorless crystals of melting point 86° C.
7. N-diethylaminoethyl-2-pyridone-5-carboxylic acid-anilide. Colorless crystals: melting point of the base 100–102° C.
8. N-diethylaminoethyl-2-quinolone. Yellow oil boiling at 168–170° C. at 2 mm. pressure.
9. N-diethylaminoethyl-6-ethoxy-2-quinolone. Yellowish oil boiling at 198–200° C. at 2 mm. pressure.

The compounds of the foregoing table correspond with the following formulas:

(1) 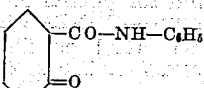

(2) 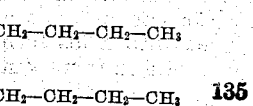

(3) 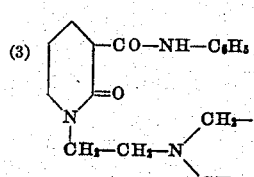

(4) 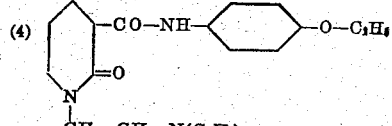

(5) 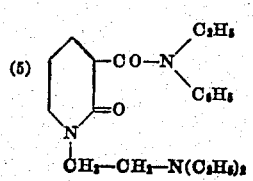

(6) 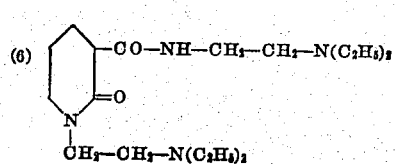

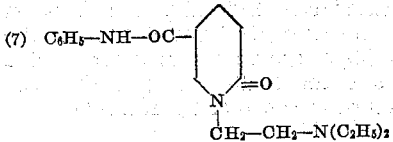
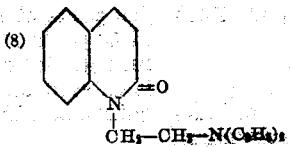
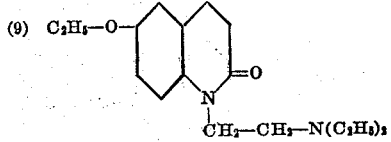

What we claim is:—

1. The pyridones of the general formula

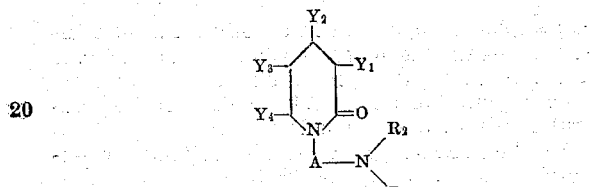

wherein A represents an alkylene chain containing at least two carbon atoms, and $R_1$ and $R_2$ mean hydrogen or alkyl, or together may stand for an alkylene chain to form a heterocyclic six member ring, or may also stand for the phthaloyl radical, and wherein the Y's may stand for hydrogen, $Y_1$ or $Y_2$ may also stand for phenyl or methyl and $Y_1$, $Y_2$ or $Y_3$ for a group —$CONX_2$, wherein X may be hydrogen, phenyl, alkyl or diethylaminoethyl, and wherein $Y_1$ and $Y_2$ or $Y_3$ and $Y_4$ may also stand for part of a benzene ring, which products treated with acids form water-soluble salts, and are useful in therapeutics.

2. The pyridones of the general formula

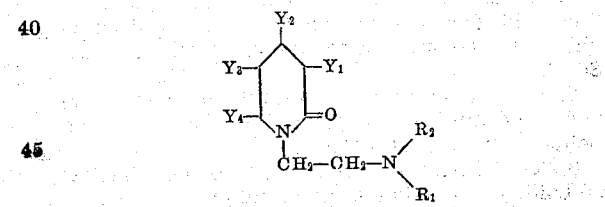

wherein $R_1$ and $R_2$ mean hydrogen or alkyl, or together may stand for an alkylene chain to form a heterocyclic six member ring, or may also stand for the phthaloyl radical, and wherein the Y's may stand for hydrogen, $Y_1$ or $Y_2$ may also stand for phenyl or methyl and $Y_1$, $Y_2$ or $Y_3$ for a group —$CONX_2$, wherein X may be hydrogen, phenyl, alkyl or diethylaminoethyl, and wherein $Y_1$ and $Y_2$ or $Y_3$ and $Y_4$ may also stand for part of a benzene ring, which products treated with acids form water-soluble salts, and are useful in therapeutics.

3. The pyridones of the general formula

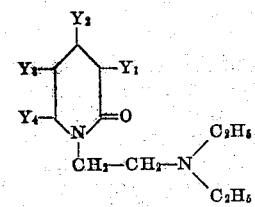

wherein the Y's may stand for hydrogen, $Y_1$ or $Y_2$ may also stand for phenyl or methyl and $Y_1$, $Y_2$ or $Y_3$ for a group —$CONX_2$, wherein X may be hydrogen, phenyl, alkyl or diethylaminoethyl, and wherein $Y_1$ and $Y_2$ or $Y_3$ and $Y_4$ may also stand for part of a benzene ring, which products treated with acids form water-soluble salts, and are useful in therapeutics.

4. The N-diethylaminoethyl-2-pyridone-3-carboxylic acid anilide of the formula

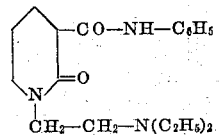

an oil of boiling point 205° C. at 0.3 mm. pressure, soluble in organic solvents and in acids, and forming a monohydrochloride of melting point 195° C., which product is useful in therapeutics.

5. The N-diethylaminoethyl-2-pyridone of the formula

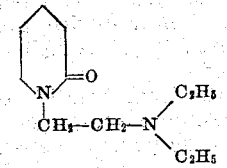

a colorless oil of boiling point 127° C. at 1 mm. pressure, soluble in water and in organic solvents, and forming a water-soluble mono-hydrochloride of melting point 148° C. when anhydrous, which product is useful in therapeutics.

KARL MIESCHER.
ERNEST URECH.